United States Patent [19]
Lomas et al.

[11] 4,434,245
[45] * Feb. 28, 1984

[54] FLUID PARTICLE COOLING PROCESS AND APPARATUS

[75] Inventors: David A. Lomas, Arlington Heights; Gregory J. Thompson, Waukegan, both of Ill.

[73] Assignee: UOP Inc., Des Plaines, Ill.

[ * ] Notice: The portion of the term of this patent subsequent to Oct. 12, 1999 has been disclaimed.

[21] Appl. No.: 413,047

[22] Filed: Aug. 30, 1982

Related U.S. Application Data

[63] Continuation-in-part of Ser. No. 273,296, Jun. 15, 1981, Pat. No. 4,353,812.

[51] Int. Cl.³ ............... B01J 21/20; B01J 29/38; C10G 11/18; F27B 15/08
[52] U.S. Cl. ............... 502/2; 34/57 A; 62/57; 165/104.16; 208/164; 364/500; 502/41
[58] Field of Search ............... 252/417; 208/164; 62/57; 34/57 A; 165/104.16

[56] References Cited

U.S. PATENT DOCUMENTS

| | | | |
|---|---|---|---|
| 2,439,811 | 4/1948 | Jewell | 252/417 |
| 2,463,623 | 3/1949 | Huff | 23/288 |
| 2,492,948 | 1/1950 | Berger | 252/417 |
| 2,506,123 | 5/1950 | Watson | 28/288 |
| 2,515,156 | 7/1950 | Jahnig et al. | 23/288 |
| 2,596,748 | 5/1952 | Watson et al. | 252/417 |
| 2,735,744 | 2/1956 | Rex | 252/417 |
| 2,735,802 | 2/1956 | Jahnig | 422/144 |
| 2,819,951 | 1/1958 | Medlin et al. | 23/288 |
| 2,862,798 | 12/1958 | McKinney | 23/288 |
| 2,873,175 | 2/1959 | Owens | 23/288 |
| 2,970,117 | 1/1961 | Harper | 252/417 |
| 3,156,538 | 11/1964 | Schneider | 165/104.16 |
| 3,672,069 | 6/1972 | Reh et al. | 34/57 A |
| 3,990,992 | 11/1976 | McKinney | 252/417 |
| 4,219,442 | 8/1980 | Vickers | 252/417 |
| 4,238,631 | 12/1980 | Daviduk et al. | 585/469 |
| 4,353,812 | 10/1982 | Lomas et al. | 252/417 |

OTHER PUBLICATIONS

"Fluidized-bed Heat Transfer: A Generalized Dense--phase Correlation"; *A.I.Ch.E. Journal;* Dec. 1956; vol. 2, No. 4; pp. 482–488.

*Primary Examiner*—P. E. Konopka
*Attorney, Agent, or Firm*—James R. Hoatson, Jr.; Louis A. Morris; William H. Page, II

[57] ABSTRACT

A process and associated apparatus for the cooling of hot fluidized solid particles. The particles flow from a dense phase fluidized bed into the shell side of a vertically oriented shell and tube heat exchanger where cooling occurs via indirect heat exchange with a cooling media circulating in the tubes. The extent of cooling is controlled by the varying of the heat transfer coefficient between the tubes and particles in the heat exchanger which are maintained as a dense phase fluidized bed. The coefficient is varied by varying a combination of the variables comprising the quantity of fluidizing gas to the fluidized bed in the heat exchanger and the quantity of particle flow through that bed. The process has particular applicability to a combustive regeneration process and most particular applicability to the FCC process.

5 Claims, 1 Drawing Figure

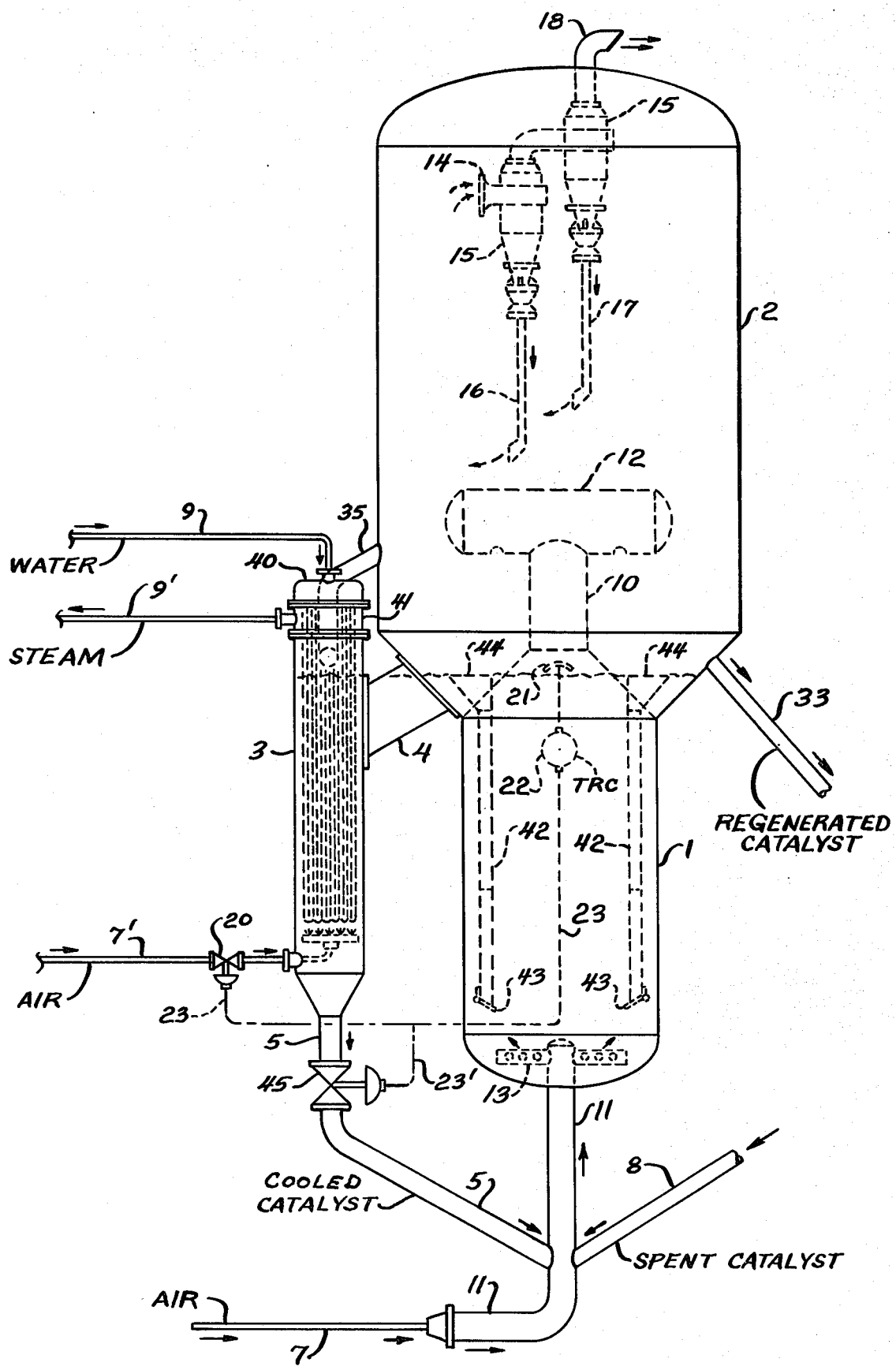

FLUID PARTICLE COOLING PROCESS AND APPARATUS

CROSS REFERENCE TO RELATED APPLICATION

This application is a continuation-in-part of our prior co-pending application Ser. No. 273,296, filed June 15, 1981 and issued on Oct. 2, 1982 as U.S. Pat. No. 4,353,812, incorporated herein by reference.

BACKGROUND OF THE INVENTION

The field of art to which this invention pertains is fluid particle cooling. It particularly relates to the combustion of combustible material from a particulated solid such as fluidizable catalyst which has been contaminated by the deposition thereupon of the combustible material, coke. The present invention will be most useful in a process for regenerating coke-contaminated fluid cracking catalyst, but it should find use in any process in which combustible material is burned from solid, fluidizable particles.

DESCRIPTION OF THE PRIOR ART

The fluid catalytic cracking process (hereinafter FCC) has been extensively relied upon for the conversion of starting materials, such as vacuum gas oils, and other relatively heavy oils, into lighter and more valuable products. FCC involves the contact in a reaction zone of the starting material, whether it be vacuum gas oil or another oil, with a finely divided, or particulated, solid, catalystic material which behaves as a fluid when mixed with a gas or vapor. This material possesses the ability to catalyze the cracking reaction, and in so acting it is surface-deposited with coke, a by-product of the cracking reaction. Coke is comprised of hydrogen, carbon and other material such as sulfur, and it interferes with the catalytic activity of FCC catalysts. Facilities for the removal of coke from FCC catalyst, so-called regeneration facilities or regenerators, are ordinarily provided within an FCC unit. Regenerators contact the coke-contaminated catalyst with an oxygen containing gas at conditions such that the coke is oxidized and a considerable amount of heat is released. A portion of this heat escapes the regenerator with flue gas, comprised of excess regeneration gas and the gaseous products of coke oxidation, and the balance of the heat leaves the regenerator with the regenerated, or relatively coke free, catalyst. Regenerators operating at superatmospheric pressures are often fitted with energy-recovery turbines which expand the flue gas as it escapes from the regenerator and recover a portion of the energy liberated in the expansion.

The fluidized catalyst is continuously circulated from the reaction zone to the regeneration zone and then again to the reaction zone. The fluid catalyst, as well as providing catalytic action, acts as a vehicle for the transfer of heat from zone to zone. Catalyst exiting the reaction zone is spoken of as being "spent", that is partially deactivated by the deposition of coke upon the catalyst. Catalyst from which coke has been substantially removed is spoken of as "regenerated catalyst."

The rate of conversion of the feedstock within the reaction zone is controlled by regulation of the temperature, activity of catalyst and quantity of catalyst (i.e. catalyst to oil ratio) therein. The most common method of regulating the temperature is by regulating the rate of circulation of catalyst from the regeneration zone to the reaction zone which simultaneously increases the catalyst/oil ratio. That is to say, if it is desired to increase the conversion rate an increase in the rate of flow of circulating fluid catalyst from the regenerator to the reactor is effected. Inasmuch as the temperature within the regeneration zone under normal operations is invariably higher than the temperature within the reaction zone, this increase in influx of catalyst from the hotter regeneration zone to the cooler reaction zone effects an increase in reaction zone temperature. It is interesting to note that this higher catalyst circulation rate is sustainable by virtue of the system being a closed circuit, and, the higher reactor temperature is sustainable by virtue of the fact that increased reactor temperatures, once effected, produce an increase in the amount of coke being formed in the reaction and deposited upon the catalyst. This increased production of coke, which coke is deposited upon the fluid catalyst within the reactor, provides, upon its oxidation within the regenerator, an increased evolution of heat. It is this increased heat evolved within the regeneration zone which, when conducted with the catalyst to the reaction zone, sustains the higher reactor temperature operation.

Recently, politico-economic restraints which have been put upon the traditional lines of supply of crude oil have made necessary the use, as starting materials in FCC units, of heavier-than-normal oils. FCC units must now cope with feedstocks such as residual oils and in the future may require the use of mixtures of heavy oils with coal or shale derived feeds.

The chemical nature and molecular structure of the feed to the FCC unit will affect that level of coke on spent catalyst. Generally speaking, the higher the molecular weight, the higher the Conradson carbon, the higher the heptane insolubles, and the higher the carbon to hydrogen ratio, the higher will be the coke level on the spent catalyst. Also, high levels of combined nitrogen, such as found in shale derived oils, will also increase the coke level on spent catalyst. The processing of heavier and heavier feedstocks, and particularly the processing of deasphalted oils, or direct processing of atmospheric bottoms from a crude unit, commonly referred to as reduced crude, does cause an increase in all or some of these factors and does therefore cause an increase in coke level on spent catalyst.

This increase in coke on spent catalyst results in a larger amount of coke burnt in the regenerator per pound of catalyst circulated. Heat is removed from the regenerator in conventional FCC units in the flue gas and principally in the hot regenerated catalyst stream. An increase in the level of coke on spent catalyst will increase the temperature difference between the reactor and the regenerator, and in the regenerated catalyst temperature. A reduction in the amount of catalyst circulated is therefore necessary in order to maintain the same reactor temperature. However, this lower catalyst circulation rate required by the higher temperature difference between the reactor and the regenerator will result in a fall in conversion, making it necessary to operate with a higher reactor temperature in order to maintain conversion at the desired level. This will cause a change in yield structure which may or may not be desirable, depending on what products are required from the process. Also there are limitations to the temperatures that can be tolerated by FCC catalyst without there being a substantial detrimental effect on catalyst activity. Generally, with commonly available modern FCC catalyst, temperatures of regenerated catalyst are usually maintained below 1400° F., since loss of activity would be very severe about 1400°-1450° F. If a relatively common reduced crude such as that derived from Light Arabian crude oil were charged to a conventional FCC unit, and operated at a temperature required for high conversion to lighter products, i.e. similar to that for a gas oil charge, the regenerator temperature would operate in the range of 1600°-1800° F. This would be too high a temperature for the catalyst, require very expensive materials of construction, and given an extremely low catalyst circulation rate. It is therefore accepted that when materials are processed that would give excessive regenerator temperatures, a means must be provided for removing heat from the regenerator, which enables a lower regenerator temperature, and a lower temperature difference between the reactor and the regenerator.

A common prior art method of heat removal provides coolant filled coils within the regenerator, which coils are in contact with the catalyst from which coke is being removed. For example, Medlin et al U.S. Pat. No. 2,819,951, McKinney U.S. Pat. No. 3,990,992 and Vickers U.S. Pat. No. 4,219,442 disclose fluid catalytic cracking processes using dual zone regenerators with cooling coils mounted in the second zone. These cooling coils must always be filled with coolant and thus be removing heat from the regenerator, even during start-up when such removal is particularly undesirable, because the typical metallurgy of the coils is such that the coils would be damaged by exposure to the high regenerator temperatures (up to 1350° F.) without coolant serving to keep them relatively cool. The second zone is also for catalyst disengagement prior to passing the flue gas from the system, and may contain catalyst in a dense phase (Medlin et al and Vickers) or in a dilute phase (McKinney). Coolant flowing through the coils absorbs heat and removes it from the regenerator.

The prior art is also replete with disclosures of FCC processes which utilize dense or dilute phase regenerated fluid catalyst heat removal zones or heat exchangers that are remote from and external to the regenerator vessel to cool hot regenerated catalyst for return to the regenerator. Examples of such disclosures are as set forth in Harper U.S. Pat. No. 2,970,117; Owens U.S. Pat. No. 2,873,175; McKinney U.S. Pat. No. 2,862,798; Watson et al U.S. Pat. No. 2,596,748; Jahnig et al U.S. Pat. No. 2,515,156; Berger U.S. Pat. No. 2,492,948; and Watson U.S. Pat. No. 2,506,123. At least one of the above U.S. Patents (Harper) discloses that the rate of return of the cooled catalyst to the regenerator may be controlled by the regenerator (dense catalyst phase) temperature.

An important consideration in the above FCC processes involving regenerator heat removal is the method of control of the quantity of heat removed. For example, in Vickers U.S. Pat. No. 4,219,442 the method involves the control of the extent of immersion of cooling coils in a dense phase regenerated catalyst fluidized bed. In Harper U.S. Pat. No. 2,970,117 and Huff U.S. Pat. No. 2,463,623, the sole method involves regulation of the rate of flow of regnerated catalyst through external catalyst coolers. The disadvantages of the first above heat removal method have been previously discussed, i.e. interference of the cooling coils with unit start-up and catalyst disengagement. The above second method of heat removal, utilizing external coolers and varying the rate of catalyst circulation through them as the exclusive means of control of the heat exchanger duty, involves the continual substantial changing of the catalyst loading on the regenerator with the associated difficulty or impossibility of maintaining convenient steady state operations to an acceptable extent.

It is known to those skilled in the art of chemical engineering that the heat transfer coefficient of a heat exchange surface varies in relation to the mass velocity across such surface for fluidizing systems. See, for example, the article "Fluidized-bed Heat Transfer: A Generalized Dense-phase Correlation"; *A.I.Ch.E. Journal;* December, 1956; Vol. 2, No. 4; ppg. 482-488.

The present invention enables a high degree of flexibility and efficiency of operation of a fluidized particle cooler, particularly when associated with an FCC regenerator, with the cooler remote from the FCC regenerator, but unlike the above prior art FCC processes, the present invention controls the rate of cooling by the heat exchanger in a manner based upon principles involving the relationship between heat transfer coefficients and mass velocity, and not just by varying the flow rate of circulating catalyst.

SUMMARY OF THE INVENTION

Accordingly, the invention is, in one embodiment, a process for the cooling of hot fluidized solid particles from a first dense phase fluidized bed of the particles comprising transporting the hot particles from the first bed to the upper locus of a cooling zone separate from the first bed where in the cooling zone the hot particles are passed downwardly and heat is withdrawn from the hot particles by indirect heat exchange with a cooling fluid enclosed in a heat exchange means inserted into the cooling zone to produce relatively cool particles. The particles are maintained in the cooling zone as a second dense phase fluidized bed by passing a fluidizing gas upwardly through such second bed. The quantity of heat withdrawal from the particles in the cooling zone is controllably maintained by controlling a combination of the variables comprising the quantity of the fluidizing gas into the second bed and the quantity of particle flow through the second bed. The heat transfer coefficient between the heat exchange means and the second fluidized bed and thus the quantity of heat transferred is thereby controlled.

In a second embodiment, the invention is an apparatus for cooling hot fluidized solid particles which apparatus comprises in combination: (a) a hot particle collection chamber; (b) a shell and tube heat exchanger of vertical orientation, remote from the collection chamber, having a particle inlet and an upper portion of the shell side of the heat exchanger and a particle outlet at a bottom portion of the shell side of the heat exchanger; (c) a hot particle conduit connecting the hot particle collection chamber with the heat exchanger inlet, such that hot particles can flow from the disengagement chamber to the heat exchanger; (d) a fluidizing gas inlet conduit connected to a bottom portion of the shell side of the heat exchanger, such that fluidizing gas can pass into the shell side and maintain a fluidized catalyst bed therein; (e) a cooled particle conduit connecting the catalyst outlet of the heat exchanger with the region of disposition of the cooled particles, such that cooled particles can flow from the heat exchanger to the region of disposition; (f) control valves placed in the fluidizing gas inlet conduit and the cooled particles conduit, and a control system comprising means to sense a temperature comprising a controlled variable controlled by the duty of the heat exchanger, temperature control means having an adjustable set point connecting with the temperature sensing means and developing output signals, and means for transmitting the output signals to the control valves whereby the latter are adjusted responsive to the temperature, thereby regulating the flow of fluidizing gas into the heat exchanger and the flow of cooled particles from the heat exchanger, and thereby regulating the heat transfer coefficient between the outside surface of the tubes of the heat exchanger and the fluidized catalyst bed, and thereby regulating the duty; and (g) inlet and outlet conduits connected to the tubes of the heat exchanger, such that a cooling fluid can flow through the tubes.

Other embodiments of the present invention encompass further details such as process streams and the function and arrangement of various components of the apparatus, all of which are hereinafter disclosed in the following discussion of each of these facets of the invention.

BRIEF DESCRIPTION OF THE DRAWING

The FIGURE is a sectional, elevational view of a regeneration apparatus according to one embodiment of the present invention, showing combustion zone 1, disengagement zone 2, cooling zone (heat exchanger) 3, hot catalyst conduit 4, heat exchanger and cooled catalyst discharge conduit 5 as well as various details showing the interconnection of heat exchanger 3 with disengagement zone 2.

The above described drawing is intended to be schematically illustrative of the present invention and not be a limitation thereon.

DETAILED DESCRIPTION OF THE INVENTION

The present invention, in its process aspects, consists of steps for the cooling of a fluidized particulate solid. An important application of the invention will be for a process for the combustion of a combustible material from fluidized solid particles containing the combustible material, including the step of introducing oxygen containing combustion gas and the fluidized solid particles into a combustion zone maintained at a temperature sufficient for oxidation of the combustible material. The combustible material will be oxidized therein to produce the first dense phase fluidized bed of hot fluidized solid particles cooled by the process of the invention.

The above combustion zne may be in dilute phase with the hot particles transported to a disengaging zone wherein the hot particles are collected and maintained as the first bed, or the combustion zone may be in dense phase and in itself comprise the first bed.

In a particularly important embodiment of the invention, there will be included steps for the regenerative combustion within a combustion zone of a coke contaminated FCC catalyst from a rection zone to form hot flue gas and hot regenerated catalyst, disengagement and collection of the hot regenerated catalyst, cooling of a portion of the hot regenerated catalyst within a heat removal or cooling zone, using the cooled regenerated catalyst as a heat sink, and the use of at least a portion of the cooled regenerated catalyst for control of the temperatures of the combustion zone. As used herein, the term "hot regenerated catalyst" means regenerated catalyst at the temperature leaving the combustion zone, from about 1300° F. to about 1400° F., while the term "cool regenerated catalyst" means regenerated catalyst at the temperature leaving the cooling zone, about 200° F. less than the temperature of the hot regenerated catalyst.

Reference will now be made to the attached drawing for a discussion of an example of the regeneration process embodiment and associated apparatus of the invention. In the FIGURE regeneration gas, which may be air or another oxygen containing gas, enters in line 7 and mixes with coke contaminated catalyst entering in conduit 8, and cool regenerated catalyst entering in conduit 5. These streams are shown as all flowing together into mixing conduit 11, although each stream could flow individually into combustion zone 1. The resultant mixture of coke contaminated catalyst, regenerated catalyst and regeneration gas are distributed into the interior of combustion zone 1, at a lower locus thereof, via conduit 11 and distributor 13. Coke contaminated catalyst commonly contains from about 0.1 to about 5 wt.% carbon, as coke. Coke is predominantly comprised of carbon, however, it can contain from about 5 to about 15 wt.% hydrogen, as well as sulfur and other materials. The regeneration gas and entrained catalyst flows upward from the lower part of combustion zone 1 to the upper part thereof in dilute phase. The term "dilute phase", as used herein, shall mean a catalyst/gas mixture of less than 30 lbs. per cubic foot, and "dense phase" shall mean such mixture equal to or more than 30 lbs. per cubic foot. Dilute phase conditions, that is a catalyst/gas mixture of less than 30 lbs. per cubic foot, and typically 2-10 lbs. per cubic foot, are the most efficient for coke oxidation. As the catalyst/gas mixture ascends within combustion zone 1 the heat of combustion of coke is liberated and absorbed by the now relatively carbon free catalyst, in other words by the regenerated catalyst.

The rising catalyst/gas stream flows through passageway 10 and impinges upon surface 12, which impingement changes the direction of flow of the stream. It is well known in the art that impingement of a fluidized particulate stream upon a surface, causing the stream to turn through some angle, can result in the separation from the stream of a portion of the solid material therein. The impingement of the catalyst/gas stream upon surface 12 causes almost all of the hot regeneration catalyst flowing from the combustion zone to disengage from the flue gas and fall to the bottom portion of disengagement zone 2. The catalyst collection area of the disengagement zone may be a cone-shaped annular receptacle, as shown, or any other shape appropriate for collecting catalyst particles. The gaseous products of coke oxidation and excess regeneration gas, or flue gas, and the very small uncollected portion of hot regenerated catalyst flow up through disengagement zone 2 and enters separation means 15 through inlet 14.

These separation means may be cyclone separators, as schematically shown in the FIGURE, or any other effective means for the separation of particulated catalyst from a gas stream. Catalyst separated from the flue gas falls to the bottom of disengagement zone 2 through conduits 16 and 17. The flue gas exits disengagement zone 2 via conduit 18, through which it may proceed to associated energy recovery systems. Having the disengagement zone in upward communication with the combustion zone is advantageous, in comparison to schemes in which the gas/catalyst mixture flows upward into a relatively dense phase heat removal zone, in that, with the former, there is a substantial reduction in the loading of the regenerator cyclones which virtually eliminates large losses of catalyst from FCC units during operational upsets.

With further reference to the FIGURE, in one embodiment of the present invention, a first portion of catalyst collected in the disengaging zone is passed in dense phase, via hot catalyst recycle conduit 4, downwardly into cooling zone 3 which comprises a shell and tube heat exchanger. First catalyst recycle conduit 4 connects to the shell side of heat exchanger 3. Heat exchanger 3 will be of vertical orientation with the catalyst flowing into the shell and the heat exchange medium passing through the tubes via lines 9 and 9'. The preferred heat exchange medium would be water, which would change at least partially from liquid to gas phase when passing through the tubes. The tube bundle in the heat exchanger will preferably be of the "bayonet" type wherein one end of the bundle is unattached, thereby minimizing problems due to the expansion and contraction of the heat exchanger components when exposed to and cooled from the very high regenerated catalyst temperatures. The heat transfer that occurs is, from the catalyst, through the tube walls and into the heat transfer medium. Fluidizing gas, preferably air, is passed into a lower portion of the shell side of heat exchanger 3 via line 7', thereby minimizing a dense phase fluidized catalyst bed in the shell side. Control valve 20 is placed in line 7'. Control valve 45 in conduit 5 regulates catalyst flow through heat exchanger 3. An associated control system will comprise means 21 to sense the temperature in a portion of combustion zone 1, such as the upper portion shown, temperature control means 22 having an adjustable set point connecting with temperature sensing means 21 and developing output signals, and means 23 and 23' for transmitting the output signals to control valve 20 and control valve 45, respectively, whereby the valves may be adjusted responsive to the temperature at the upper portion of combustion zone 1. Temperature control means 22, which may incorporate an analogue or digital computer, will have a capability of selecting the optimum combination of fluidizing gas and catalyst flow rates. Such capability may be built or programmed into means 22 for a given system by one skilled in the art and probably be based on empirical relationships derived from the observed operation of the system. The flow of fluidizing gas to the shell side of heat exchanger 3 and the flow of catalyst through heat exchanger 3 will thereby be regulated which in turn regulates the mass velocity of the fluidized bed over the outside surfaces of the tubes by affecting the extent of turbulence and mass flow of the bed, which in turn regulates the heat transfer coefficient across such surfaces, and thus the quantity of heat transfer. Of course, the varying of the rate of catalyst circulation will to some extent preclude steady state operations, but the degree of disruption of steady state operations will remain at an acceptable level due to the combining of fluidizing gas rate control with the catalyst rate control to control heat exchanger duty.

Still referring to the FIGURE, the catalyst will flow from the bottom portion of heat exchanger 3, through heat exchanger catalyst discharge conduit 5, and into the lower portion of combustion chamber 1 via mixing conduit 11. The latter conduit, shown in vertical orientation, will also be the recipient of the spent catalyst from the reactor via conduit 8. The regeneration gas is also introduced into mixing conduit 11 via line 7 and serves to carry the catalyst mixture into combustion chamber 1. The catalyst-regeneration gas mixture passes into the lower locus of the combustion zone via distributor 13. Hot regenerated catalyst is returned to the FCC reactor via conduit 33.

Details are shown in the FIGURE of a preferred embodiment of heat exchanger 3 and the manner of the interconnection of heat exchanger 3 with disengagement zone 2. Heat exchanger 3 is shown with the shell side filled with a dense phase fluidized catalyst bed to a level slightly higher than the catalyst inlet into heat exchanger 3. Catalyst flows into the inlet of conduit 4 from the catalyst collection section at the bottom of collection chamber 2 and flows through conduit 4 into heat exchanger 3. An optional vent 35 is shown from heat exchanger 3 to disengagement chamber 2 above hot catalyst conduit 4 which serves to allow fluidizing gas to escape from the shell of heat exchanger 3 into the disengagement zone. This vent would be required only in those instances where the internal diameter of recycle conduit 4 is insufficient to supply required solids loading to heat exchanger 3 and at the same time countercurrent venting of the flue gas, the latter being the most desirable configuration. The tube bundle shown is of the bayonet type in which the tubes are attached at the top or "head" of the heat exchanger, but not at any other location. A typical configuration of tubes in the bayonet type bundle would be one inch tubes each descending from inlet manifold 40 in the head down into the shell through a three inch tube sealed at its bottom, each one inch tube emptying into the three inch tubes in which it is contained just above the sealed end of the three inch tube. A liquid, such as water, would be passed down into the one inch tubes, would empty into the three inch tubes, would absorb heat from the hot catalyst through the wall of the three inch tubes as it passed upward through the annular space of the three inch tubes and would exit the heat exchanger, at least partially vaporized, from outlet manifold 41 in the head. It is essential that the quantity of hot particles or catalyst entering heat exchanger 3 be sufficient to maintain a depth of dense phase fluid catalyst bed which substantially submerges the tubes in the dense phase bed. There are a number of ways of accomplishing this objective, one of which is shown in the FIGURE. It is assumed that the flow of hot catalyst into the disengagement zone will always exceed the heat exchanger and hot catalyst exit (via conduit 33) flow requirements and the operation will be set up so that will in fact be the case. Shown in the FIGURE is dipleg or standpipes 42 with bottom flapper valves 43 and upper weirs 44. Catalyst which does not flow through heat exchanger 3 and conduit 33 will overflow weirs 44 and fill diplegs 42. When the force exerted by the head of catalyst filling diplegs 42 on flapper valves 43 exceeds that pressure required to open valves 43, i.e. overcome the force exerted by the spring or counterweight holding the valves closed, catalyst will empty from the diplegs into combustion chamber 1. The flapper valves and/or head of catalyst in the diplegs also serve to prevent undesired reversal of flow up the dipleg. The dense phase bed level and thus the catalyst head available to heat exchanger 3 will therefore be held at the level of the lip of weirs 44.

The above scheme provides the ability to remove heat from the FCC regenerator as required to maintain a maximum combustion zone temperature and at the same time maintain an acceptable degree of stable steady state operation conducive to the controllability and efficiency of the regenerator, all while enjoying flexibility and ease of operation of an external catalyst cooler or heat exchanger (particularly the ability to not have to utilize cooling during start-up) and the efficiency of catalyst-flue gas separation achieved by a disengagement zone unencumbered by a dense catalyst phase and heat removing paraphernalia.

It should be emphasized, however, that the FCC embodiment illustrated by the FIGURE is only one possible application of the present invention which in its broadest sense is a process for cooling any hot fluidized particles for any purpose. Although the FIGURE incorporates details to illustrate a particularly preferred embodiment of the present invention, i.e. cooling means associated with a particular design of FCC regenerator, the apparatus aspect of the present invention in its broadest sense as summarized above may also be identified. Thus, the bottom of disengagement zone 2 comprises the hot particle collection chamber, heat exchanger 3 is the shell and tube heat exchanger of vertical orientation, conduit 4 is the hot particle conduit, line 7' is the fluidizing gas inlet conduit, discharge conduit 5 is the cooled particle conduit, mixing conduit 11 is the region of disposition of the cooled particles (although that disposition might also be directly into combustion zone 1), temperature control means 22 is the temperature control means, valves 20 and 45 regulate the flow of fluidizing gas and particle flow in line 7' and conduit 5, respectively, and lines 9 and 9' are the cooling fluid inlet and outlet conduits. The controlled variable illustrated is the temperature at a selected location in combustion zone 1. Temperature control means 22 will, via valves 20 and 45, effect the respective regulation of the flow of fluidizing gas into the heat exchanger and the flow of cooled particles from the heat exchanger, thereby regulating the heat transfer coefficient between the outside surface of the tubes of the heat exchanger and the fluidized catalyst bed, which, in turn, regulates the duty of the heat exchanger.

We claim:

1. A process for the controlled cooling of hot fluidized catalysts which comprises:
   (a) passing spent catalyst having coke deposited thereon, cooled catalyst and regeneration gas containing oxygen to the lowermost portion of a catalytic combustion chamber to oxidize said coke in a relatively dense bed of fluidized catalyst;
   (b) passing said oxidized catalyst upward through said combustion chamber to an uppermost section of said combustion chamber containing catalyst in a relatively dilute phase;
   (c) passing said oxidized catalyst through said uppermost section of said combustion chamber to a surmounted disengagement chamber having a relatively dense phase of catalyst collecting in the lowermost portion of said disengagement chamber;
   (d) passing said catalyst from said lowermost portion of said disengagement chamber to a heat removal zone situated extrinsic from said combustion and said disengagement chamber;
   (e) cooling said catalyst in said extrinsic heat removal zone by indirect heat exchange against a cooling fluid entered and removed from said extrinsic heat exchange zone;
   (f) fluidizing said catalyst in said heat exchange zone by passage of a fluidizing gas in direct contact with said catalyst being cooled;
   (g) passing said cooled catalyst to said combustion chamber as the cooled catalyst of step (a), wherein said extend of fluidization in step (f) and said temperature of said regeneration system is controlled by the combination of:
      (i) sensing a temperature in the uppermost section of said combustion chamber having catalyst in said relatively dilute phase;
      (ii) transmitting said sensed temperature to a temperature controller device wherein said temperature is compared with a predetermined desired temperature set point to develop a controller output signal;
      (iii) transmitting said controller output signal to a flow regulation means which regulates the quantity of flow of fluidizing gas in step (f) to said extrinsic heat exchange zone; and
      (iv) transmitting said controller output signal to a flow regulation means which regulates the quantity of flow of cooled catalyst from said extrinsic heat exchange zone to said combustion chamber as said cooled catalyst of step (a).

2. The process of claim 1 wherein said catalyst comprise FCC catalyst.

3. The process of claim 1 wherein said fluidizing gas comprises combustion gas of step (f).

4. The process of claim 1 wherein said cooling fluid of step (e) comprises water.

5. The process of claim 4 wherein said water cooling fluid changes from liquid to gas phase while absorbing heat in said heat exchange means.

* * * * *